(12) United States Patent
Holland

(10) Patent No.: US 9,633,397 B2
(45) Date of Patent: Apr. 25, 2017

(54) SOCIAL NETWORKING WITH AUTONOMOUS AGENTS

(75) Inventor: Steven W. Holland, Saint Clair, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1527 days.

(21) Appl. No.: 12/882,893

(22) Filed: Sep. 15, 2010

(65) Prior Publication Data
US 2012/0066301 A1 Mar. 15, 2012

(51) Int. Cl.
*G06Q 50/00* (2012.01)
*H04L 29/08* (2006.01)

(52) U.S. Cl.
CPC ............ *G06Q 50/01* (2013.01); *H04L 67/12* (2013.01)

(58) Field of Classification Search
USPC .......... 709/204; 725/24, 75; 701/1; 340/988, 340/996, 995.1; 342/33
See application file for complete search history.

(56) References Cited

U.S. PATENT DOCUMENTS

| | | | | |
|---|---|---|---|---|
| 7,312,691 B2 * | 12/2007 | Zambo et al. | ............... | 340/5.72 |
| 8,344,870 B2 * | 1/2013 | Evans et al. | .................. | 340/461 |
| 8,352,643 B2 * | 1/2013 | Birnbaum et al. | .............. | 710/16 |
| 2008/0032721 A1 * | 2/2008 | MacDonald et al. | ......... | 455/466 |
| 2008/0275990 A1 * | 11/2008 | Prasad et al. | .................. | 709/225 |
| 2009/0144622 A1 * | 6/2009 | Evans et al. | .................. | 715/706 |
| 2010/0082180 A1 * | 4/2010 | Wright et al. | ................... | 701/1 |
| 2011/0028128 A1 * | 2/2011 | Cazanas et al. | ........... | 455/414.1 |
| 2011/0045842 A1 * | 2/2011 | Rork et al. | ................. | 455/456.1 |
| 2011/0185390 A1 * | 7/2011 | Faenger et al. | ................. | 725/75 |
| 2012/0197463 A1 * | 8/2012 | Brennan et al. | .................. | 701/1 |

FOREIGN PATENT DOCUMENTS

| | | |
|---|---|---|
| CN | 101605145 A | 12/2009 |
| CN | 101719233 A | 6/2010 |

OTHER PUBLICATIONS

Tim Moran, Dashboards That Promise to do More Than Inform, Jan. 15, 2009, The New York Times, pp. 1-3.*
John R. Quain, Social Networking for Cars, Jul. 20, 2010, The New York Times, pp. 2-3.*

(Continued)

*Primary Examiner* — Hassan Kizou
*Assistant Examiner* — Deepa Belur
(74) *Attorney, Agent, or Firm* — John A. Miller; Miller IP Group, PLC

(57) ABSTRACT

A system and method that allow non-human autonomous agents to participate in a social internet network. The system defines the autonomous agent by a standard email address, website address, or other such identification, that allows human participants of the social network to contact the non-human autonomous agent to perform some operation through the Internet. In one non-limiting example, the non-human autonomous agent is a vehicle that allows the vehicle owner, or user, to contact the vehicle through the social network to perform some operation, such as unlocking the vehicle doors, and allow authorized participants of the social network to see the vehicle as a participant of the network to gain information therefrom, such as the location of the vehicle.

18 Claims, 2 Drawing Sheets

(56) References Cited

OTHER PUBLICATIONS http://www.wired.com/autopia/2010/05/ford-american-journey/.*
Dashboards that promise to do more than inform—Tim Moran, Jan. 15, 2009, The NewYork Times.*
Start Your Car With Your Smartphone With Viper(R) From Directed Electronics Canada, Delson, Quebec, Canada—(Marketwire)—May 20, 2010.*
Quain, John R. "Social Networking for Cars" The New York Times, Jul. 20, 2010 URL:http://wheels.blogs.nytimes.com/2010/07/20/social-networking-for-cars.
Wert, Ray "Onstar Brings Facebook to Cars" Car Tech, Sep. 14, 2010, URL:http//jalopnik.com/5638294/onstar-brings-facebook-to-cars.

* cited by examiner

SOCIAL NETWORKING WITH AUTONOMOUS AGENTS

BACKGROUND OF THE INVENTION

1. Field of the Invention

This invention relates generally to a system and method for allowing non-human autonomous agents to participate in a social network and, more particularly, to a system and method for allowing non-human autonomous agents, such as vehicles, to participate in a social network that allows human participants of the network to contact the agents.

2. Discussion of the Related Art

A growing community of individuals that use the Internet participate in one or more social networks that allow the participants of the network to interact with each other in a social manner and exchange personal information and otherwise. Examples of such social networks include, but are not limited to, Facebook™, Twitter™, Myspace™, etc., all well known to those skilled in the art. For these types of social networks, a particular user will typically go to the network's website, enter their email address, or other unique identifier, such as an internet protocol address (IP address), and create a profile for that email address that includes information about the user. The particular network goes through a validation process, typically by sending a message to the email address entered by the user to verify that it is authentic. Once the particular user is verified and creates a profile on the network, that user can now gain access to the particular features provided by the network, which include sending messages and interacting with other participants of the network.

These networks allow the participants to post information about themselves, some of which may be personal, such as photographs, telephone numbers, addresses, etc., and then selectively allow that information to be viewed by other participants on the network in a manner that is controlled by the particular participant. A particular user of the social network may post things on their particular profile page that is available to all of the users of the network to view, and may also provide private information that only those users that are selected by the participant can view. For example, family members and close friends of a particular participant may be allowed access to information that is highly personal, while other participants of the network may be selectively allowed access to more general information about the particular participant. This allows the participants of the network to communicate and socialize with each other in a manner that allows the various participants to meet and correspond with new people. To date, all of the participants of these types of social networks have been human participants.

OnStar™ provides a wireless communications tool for so equipped vehicles that allows members that subscribe to the service to receive by email various messages and information about their vehicle that has been telematically transmitted by the vehicle to an OnStar™ service center. The OnStar™ service center provides this wireless service in a manner that is well understood by those skilled in the art. Currently, an OnStar™ subscriber may elect to receive a monthly diagnostic and information report identifying certain vehicle conditions, such as engine and transmission diagnostics, emissions system diagnostics, air bag system diagnostics, stability control system diagnostics, oil life, cellular telephone minutes, etc. OnStar™ also offers a number of other features, including hands free calling, turn-by-turn navigation, automatic crash response, emergency services, crisis assist, remote door unlock, roadside assistance, remote horn and light activation, etc. These expanding features allow a subscriber to have more information about his or her vehicle and provide certain vehicle functions remotely.

SUMMARY OF THE INVENTION

In accordance with the teachings of the present invention, a system and method are disclosed that allow non-human autonomous agents to participate in a social internet network. The system defines the autonomous agent by a standard email address, website address, or other such identification, that allows human participants of the social network to contact the non-human autonomous agent to perform some operation through the Internet. In one non-limiting example, the non-human autonomous agent is a vehicle that allows the vehicle owner, or user, to contact the vehicle through the social network to perform some operation, such as unlocking the vehicle doors, and allow authorized participants of the social network to see the vehicle as a participant of the network to gain information therefrom, such as the location of the vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a social network that includes non-human autonomous agents is merely exemplary in nature, and is in no way intended to limit the invention or its applications or uses. For example, the discussion below includes specific embodiments where a vehicle is the autonomous agent that is part of the social network. However, as will be appreciated by those skilled in the art, the autonomous agent can be any non-human machine or device from which or to which information can be exchanged.

As will be discussed in detail below, the present invention proposes a social internet network that includes non-human autonomous agents. The social network can be similar to or actually be known social networks, such as Facebook™, Twitter™, Myspace™, etc., that allows the exchange of information between participants of the network including the autonomous agent. The social network described herein is different than the existing art in that it allows the non-human autonomous agents to be one of those participants that the human agents can communicate with to perform various tasks. One specific application discussed herein is allowing a vehicle to be the autonomous agent so that vehicle owner and users, and possibly others, can communicate with the vehicle to obtain information from the vehicle or provide commands to the vehicle through the network. However, it is within the scope of the present invention that the autonomous agent can be any agent that can be in communication with the social network that may benefit from the exchange of information. Other examples include, but are not limited to, a smart house, a digital video recorder (DVR), a security system, an HVAC system, a traffic control system, etc.

Figure 1:
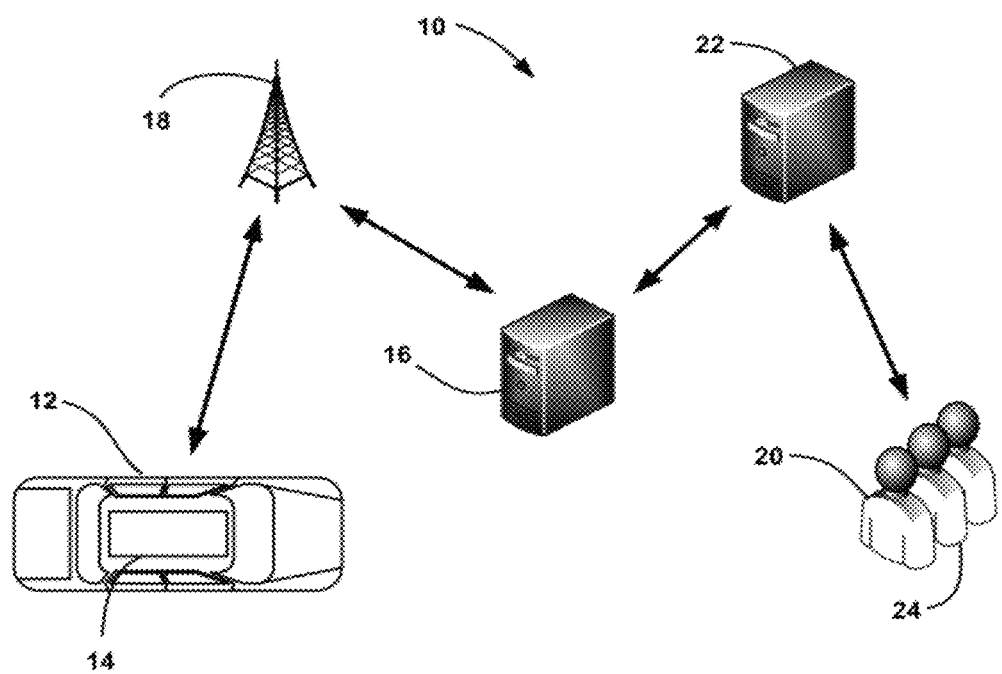
FIG. 1 is a plan view of a social networking interface between an OnStar™ user and a social internet network.

FIG. 1 is a plan view of a social internet network 10 of the type discussed above. In this example, the network 10 uses OnStar™ telematic transmissions to allow a vehicle 12 to be part of the network 10. The vehicle 12 includes on-board telematics 14 that receive diagnostic and other information from various systems on the vehicle 12 and transmit that information to an OnStar™ server 16, or service center, using a cellular network including cell towers 18. The OnStar™ communications link and operation that is part of the network 10 operates in the well known manner referred to above, where information from the vehicle 12 is received and processed, and periodically emailed to the owner of the vehicle 12 using the server 16. Further, the user of the vehicle 12 can contact the OnStar™ server 16 by telephone to provide commands to the on-board telematics 14 to cause the vehicle 12 to perform some operation, such as unlocking the vehicle doors. As mentioned above, the OnStar™ service discussed so far is well known to those skilled in the art.

In addition to the OnStar™ operations that can be performed by the network 10, the network 10 also allows the vehicle 12 to be a non-human autonomous agent of the network 10 through a social network server 22, for example, a Facebook™ server. In this embodiment, the vehicle makes contact with the network server 22 through the service center server 16. The vehicle 12 can be a participant of the social network 10 through the server 22 by giving it a unique identification, such as an OnStar™ email address VIN@OnStar.com, where "VIN" is replaced by the vehicle's identification number, for example, 1GTR2VE34BZ112963@onstar.com. The server 22 would allow the vehicle 12 to be a participant of the network 10 based on the same validation process that it would use to allow human participants to be part of the network 10. The network 10 may allow the vehicle 12, or other autonomous agent, to be part of the network 10 by other types of identification other than email addresses including other unique identifiers, such as an internet protocol address (IP address).

In this design, OnStar™ provides the programming and intelligence needed from the vehicle 12, or other device, for communicating with the network 10. In this manner, a particular participant 20 can include their vehicle as one of their contacts in the social network 10 so that the participant 20 can receive information from and provide information to the vehicle 12 through the social network 10. Additionally, the participant 20 can allow other participants 24, such as friends or users of the vehicle 12, to also receive information from the vehicle 12.

Figure 2:
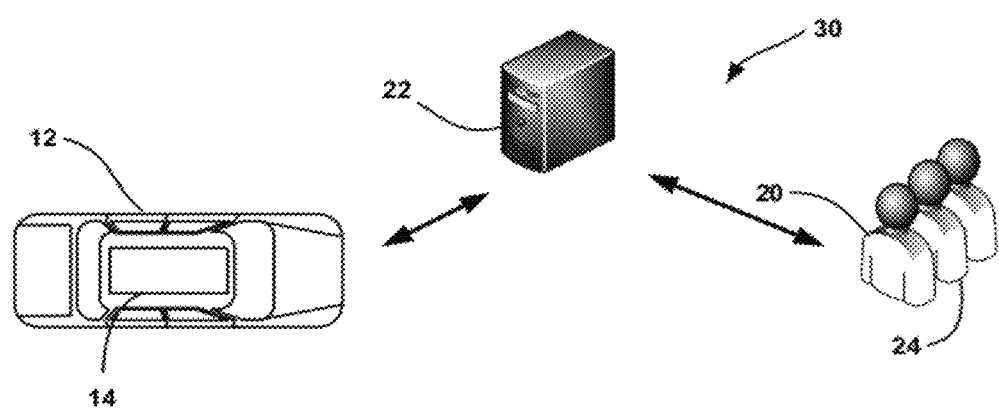
FIG. 2 is a plan view of a social internet network that provides interaction between a non-human autonomous agent, such as a vehicle, and human users of the network.

FIG. 2 is a plan view of a social network 30 where like elements to the social network 10 are identified by the same reference numeral. In this design, the vehicle 12, or other device, provides the programming and intelligence necessary to communicate with the network 30, and the network server 22 would include a basic suite of social networking primitive functions to support the non-human participants of the network 30. In the social network 30, the OnStar™ server 16 has been eliminated, so the participant 20 would contact the vehicle 12 directly through the social network server 22. Therefore, the one or more participants 20 can directly interact with the vehicle 12, where the vehicle 12 is directly considered the participant of the network 30 without having to go through the OnStar™ server 16 to provide the needed intelligent responses. Thus, in the network 30, the vehicle 12, as well as any other type of non-human autonomous agent, is a seamless participant of the network 30 in that the human participant 20 of the network 30 can communicate with and receive information from the vehicle 12 as if it were any other participant in the network 30. Telematic and other information wirelessly transmitted to the server 22 can be posted by the server 22 as part of the profile of the vehicle 12, where the actual owner or user, of the vehicle 12 would be the actual agent that controlled what information is available by other participants 24 using the network 30.

Figure 3:
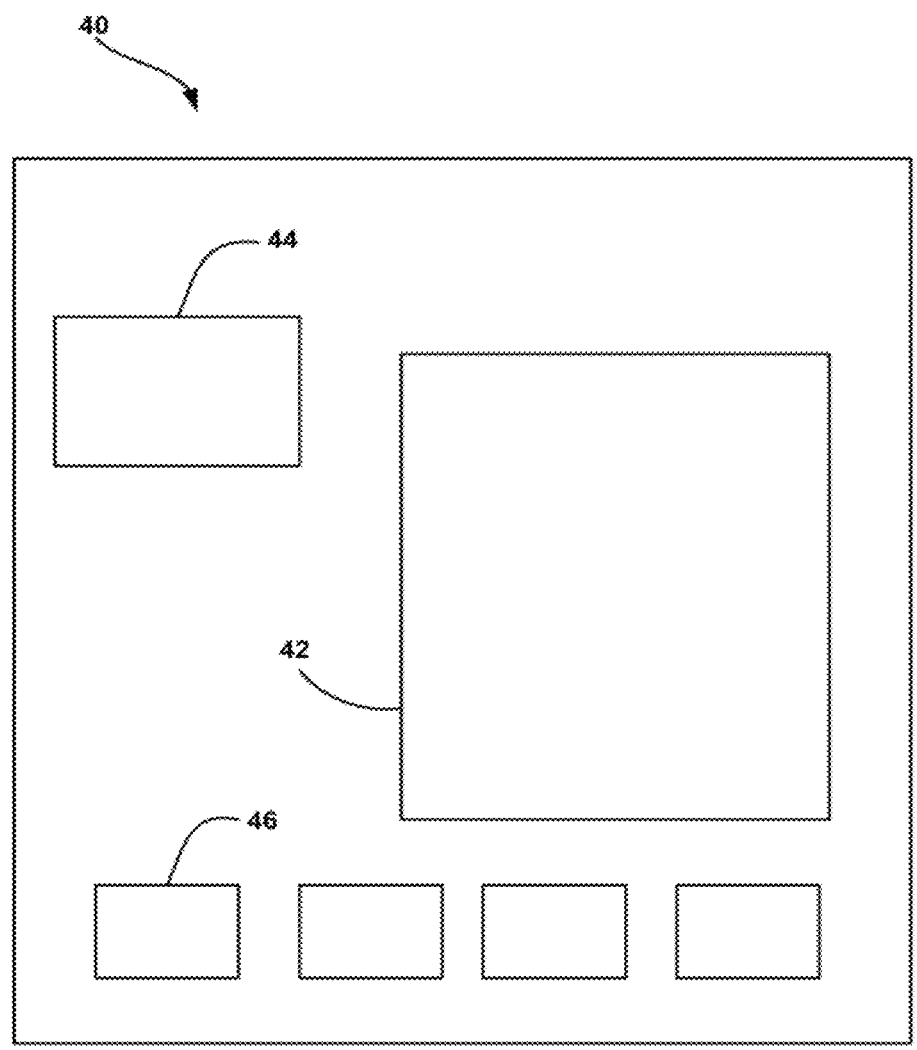
FIG. 3 is a representation of a social network screen on a computer monitor for the autonomous agent shown in FIG. 2.

FIG. 3 is a depiction of a screen 40 including a message board 42 of a participant 20 on a computer that shows a vehicle 44 as being one of the contacts for the particular participant 20. Specific buttons 46 can be provided on the screen 40, such as get vehicle location, get estimated time of arrival, unlock doors, request road side assistance, etc., to allow the user 20 easy communication with the vehicle 12. The vehicle 12 would also have its own profile screen as being one of the participants of the network 30.

Using the social network 10 or 30, the participant or participants 20 can make requests of the vehicle, such as vehicle location, vehicle estimated time of arrival to a destination, identification of destination, diagnostic status, upcoming maintenance, service appointments, etc. Further, the participant 20 can provide commands to the vehicle 12 including set destination, unlock doors, schedule update posts, report stolen vehicle, request medical assistance, request roadside assistance, etc.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A social internet network
comprising: a plurality of human participants of the network;
a plurality of non-human participants of the network; and
a server storing information about the human and non-human participants, and providing a communications link between the participants that allows the human participants to contact the non-human participants, wherein the non-human participants include vehicles and the vehicles have their own profile screen as being one of the participants of the network.

2. The social network according to claim 1 wherein the human participants and the non-human participants are identified in the network by an email address.

3. The social network according to claim 1 wherein each participating vehicle provides information to the network relating to the vehicle's location, the vehicle's estimated time of arrival at a destination, and unlocking vehicle doors.

4. The social network according to claim 1 wherein the vehicle is identified in the network by an email address that includes the vehicle's identification number.

5. The social network according to claim 1 wherein the social network provides a communication link to a wireless vehicle network.

6. The social network according to claim 5 wherein the vehicle network is OnStar™.

7. The social network according to claim 1 wherein information provided to the network for the non-human participants is controlled by a human participant of the network.

8. The social network according to claim 7 wherein the human participant that controls the non-human participant selects what other human participants of the network are allowed to access information about the non-human participants.

9. A social internet network comprising:
a plurality of human participants of the network;
a plurality of non-human participants of the network including at least one vehicle, said vehicle being a participant of the network that is controlled by human participant of the network, wherein the at least one vehicle has its own profile screen as being one of the participants of the network; and
a server storing information about the human and non-human participants, and providing a communications link between the participants that allows the human participants to contact the non-human participants, said vehicle providing information to the network relating to the vehicle's location, the vehicle's estimated time of arrival at a destination and the ability to unlock the vehicle's doors.

10. The social network according to claim 9 wherein the human participants and the non-human participants are identified in the network by an email address.

11. The social network according to claim 9 wherein each vehicle provides information to the network relating to the vehicle's location, the vehicle's estimated time of arrival at a destination, and unlocking vehicle doors.

12. The social network according to claim 9 wherein the vehicle is identified in the network by an email address that includes the vehicle's identification number.

13. The social network according to claim 9 wherein the social network provides a communication link to a wireless vehicle network.

14. The social network according to claim 13 wherein the vehicle network is OnStar™.

15. The social network according to claim 9 wherein the human participant that controls the non-human participant selects what other human participants of the network are allowed to access information about the non-human participants.

16. A method for operating a social internet network, said method comprising:
allowing a plurality of human participants to join the network;
allowing a plurality of non-human participants to join the network;
providing a server that stores information about the human and non-human participants; and
providing a communications link between the participants that allows the human participants to contact the non-human participants, wherein the non-human participants include vehicles, and the vehicles have their own profile screen as being one of the participants of the network.

17. The method according to claim 16 allowing the human participants and the non-human participants to join the network includes identifying the human and non-human participants by an email address.

18. The method according to claim 16 wherein the social network provides a communication link to a wireless vehicle network.

* * * * *